US008356050B1

(12) United States Patent
Olston et al.

(10) Patent No.: US 8,356,050 B1
(45) Date of Patent: Jan. 15, 2013

(54) METHOD OR SYSTEM FOR SPILLING IN QUERY ENVIRONMENTS

(75) Inventors: Chris Olston, Mountain View, CA (US); Khaled Elmeleegy, Sunnyvale, CA (US); Benjamin Reed, Morgan Hill, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/301,242

(22) Filed: Nov. 21, 2011

(51) Int. Cl.
*G06F 7/00* (2006.01)
*G06F 17/30* (2006.01)
(52) U.S. Cl. ........ 707/769; 707/782; 711/104; 711/148; 711/152; 711/153; 711/209
(58) Field of Classification Search .................. 707/769
See application file for complete search history.

(56) References Cited

U.S. PATENT DOCUMENTS

| | | | |
|---|---|---|---|
| 5,860,148 A * | 1/1999 | Bergantino et al. | 711/209 |
| 6,202,122 B1 * | 3/2001 | Yamada | 711/103 |
| 6,593,932 B2 * | 7/2003 | Porterfield | 345/568 |
| 7,330,960 B2 * | 2/2008 | Niles et al. | 711/209 |
| 8,160,049 B2 * | 4/2012 | Chandra et al. | 370/349 |
| 2006/0288174 A1 * | 12/2006 | Nace et al. | 711/152 |
| 2009/0307439 A1 * | 12/2009 | Jacobs et al. | 711/153 |
| 2010/0131727 A1 * | 5/2010 | Eguchi et al. | 711/162 |
| 2010/0217916 A1 * | 8/2010 | Gao et al. | 711/6 |
| 2011/0167205 A1 * | 7/2011 | Karamcheti et al. | 711/103 |

OTHER PUBLICATIONS

M. Kitsuregawa and Y. Ogawa. Bucket Spreading Parallel Hash: A new, Robust, Parallel Hash Join Method for Data Skew in the Super Database Computer (SDC). In Proc. VLDB, Brisbane, AU, 1990, 12 pages.

C.B. Walton, A.G. Dale and R.M. Jenevein. A Taxonomy and Performance Model of Data Skew Effects in Parallel Joins. In Proc. VLDB, Barcelona, ES, 1991, 12 pages.
K.A. Hua and C. Lee. Handling Data Skew in Multiprocessor Database Computers Using Partition Tuning. In Proc. VLDB, Barcelona, ES, 1991, 11 pages.
D.J. DeWitt and J. Gray. Parallel Database Systems: The Future of High Performance Database Processing. CACM, 35(6), 1992, 26 pages.
D.J. DeWitt, J.F. Naughton, D.A. Schneider, and S. Seshadri. Practical Skew Handling in Parallel Join. In Proc. VLDB, Vancouver, B.C. 1992, 14 pages.
M.D. Dahlin, O.Y. Wang, T.E. Anderson, and D.A. Patterson. Cooperative Caching: Using Remote Client Memory to Improve File System Performance. Proceedings of the First Symposium on Operating Systems Design and Implementation,1994, pp. 1-14.
J.L. Wolf, D.M. Dias, P.S. Yu, and J. Turek. New Algorithms for Parallelizing Relational Database Joins in the Presence of Data Skew, IEEE Transactions on Knowledge and Data Engineering, vol. 6, No. 6, Dec. 1994, 8 pages.
J. Protic, M. Tomasevic, and V. Milutinovic. Distributed Shared Memory: Concepts and Systems. IEEE Parallel and Distributed Technology, Belgrade RS, pp. 63-79, Summer 1996.
I. McDonald. Remote Paging in a Single Address Space Operating System Supporting Quality of Service. Technical report, Department of Computing Science, University of Glasgow, Scotland, UK, Oct. 1999, 18 pages.
P.B. Gibbons, Distinct Sampling for Highly-Accurate Answers to Distinct Values Queries and Event Reports. In Proc. VLDB, Rome, IT, 2001, 10 pages.

(Continued)

*Primary Examiner* — Binh V Ho
(74) *Attorney, Agent, or Firm* — Berkeley Law & Technology Group, LLP

(57) ABSTRACT

Methods and systems are provided that may be utilized for spilling in query processing environments.

15 Claims, 5 Drawing Sheets

OTHER PUBLICATIONS

M.A. Shah, J.M. Hellerstein, S. Chandrasekaran, and M.J. Franklin. Flux: An Adaptive Partitioning Operator for Continuous Query Systems. In Proceedings of the International Conference on Data Engineering, Oct. 2002, 15 pages.

J. Dean and S. Ghemawat. MapReduce: Simplified Data Processing on Large Clusters. In Proc. OSDI, 2004, 13 pages.

F. Chang, J. Dean, S. Ghemawat, W. C. Hsieh, D.A. Wallach, M. Burrows, T. Chandra, A. Fikes, and R.E. Gruber. Bigtable: A Distributed Storage System for Structured Data. OSDI, 2008, 14 pages.

C. Olston, B. Reed, U. Srivastava, R. Kumar, and A. Tomkins. Pig Latin: A Not-So-Foreign Language for Data Processing. In Proc. ACM SIGMOD, Vancouver, B.C. 2008, 12 pages.

Y. Xu, X. Zhou, P. Kostamaa, Liang Chen. Handling Data Skew in Parallel Joins in Shared-Nothing Systems. In Proc. SIGMOD, Vancouver, B.C., 2008, 10 pages.

M. Zaharia, A. Konwinski, A.D. Joseph, R. Katz, and I. Stoica. Improving MapReduce Performance in Heterogeneous Environments. In OSDI'08: Proceedings of the 8th USENIX Conference on Operating Systems Design and Implementation, Berkeley, CA, 2008, 14 pages.

A.F. Gates, O. Natkovich, S. Chopra, P. Kamath, S.M. Narayanamurthy, C. Olston, B. Reed, S. Srinivasan, and U. Srivastava. Building a High-Level Dataflow System on Top of MapReduce: The Pig Experience. In Proc. VLDB, Lyon, FR, 2009, 11 pages.

J. Lin. The Curse of Zipf and the Limits to Parallelization: A look at the Stragglers Problem in MapReduce. In Proc. Workshop on Large-Scale Distributed Systems for Information Retrieval, Boston, MA, 2009, 6 pages.

K. Elmeleegy, C. Olston and B. Reed. Cross-Memory Spilling in Shared-Nothing Query Processors. In Proc. VLDB, Singapore, Sep. 2010, 7 pages.

G. Ananthanarayanan, S. Kandula, A. Greenberg, I. Stoica, Y. Lu, B. Saha, and E. Harris. Reining in the Outliners in Map-Reduce Clusters Using Mantri. In. Proc. OSDI, 2010, 14 pages.

Hadoop: Pig Latin Reference Manual 1. http://pig.apache.org/docs/r0.8.0/piglatin_ref1.html. As retrieved on Jun. 29, 2011, 15 pages.

Hadoop: Pig Latin Reference Manual 2. http://pig.apache.org/docs/r0.8.0/piglatin_ref2.html. As retrieved on Jun. 29, 2011, 100 pages.

D.J. DeWitt and M. Stonebraker. MapReduce: A Major Step Backwards. http://databasecolumn.vertica.com/database-inDnovation/mapreduce-a-major-step-backwards/. As retrieved on Nov. 15, 2011, 5 pages.

Memcached: A distributed Memory Object Caching System. http://memcached.org. As retrieved on Nov. 15, 2011, 5 pages.

Hadoop: MapReduce Tutorial. http://hapdoop.apache.org/common/docs/current/mapred_tutorial.html. As retreived on Nov. 16, 2011, 29 pages.

* cited by examiner

METHOD OR SYSTEM FOR SPILLING IN QUERY ENVIRONMENTS

BACKGROUND

1. Field

The subject matter disclosed herein relates to a method or system for spilling in query processing environments.

2. Information

Processing tools or techniques continue to improve. Content is continually being generated or otherwise identified, collected, stored, shared, or processed. Databases or other like repositories are common place, as are related communication networks or computing resources that provide access to stored content.

The Internet is ubiquitous; the World Wide Web provided by the Internet continues to grow with new content seemingly being added every second. To provide access to stored content, tools or services may be provided which allow for copious amounts of stored content to be searched. For example, service providers may allow for users to search the World Wide Web or other like networks using search engines. Similar tools or services may allow for one or more databases or other like repositories to be searched.

Some processing systems access voluminous stored content available via web sites or otherwise associated with websites, such as via hyperlinks, for example, so that the websites may be added to search query rankings, for example. Stored content may be compiled in groupings of associated records, for example. However, some groupings of records may be large and a processor or similar processing system with a limited amount of memory, for example, may potentially produce processing delays if a large grouping of records is to be processed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
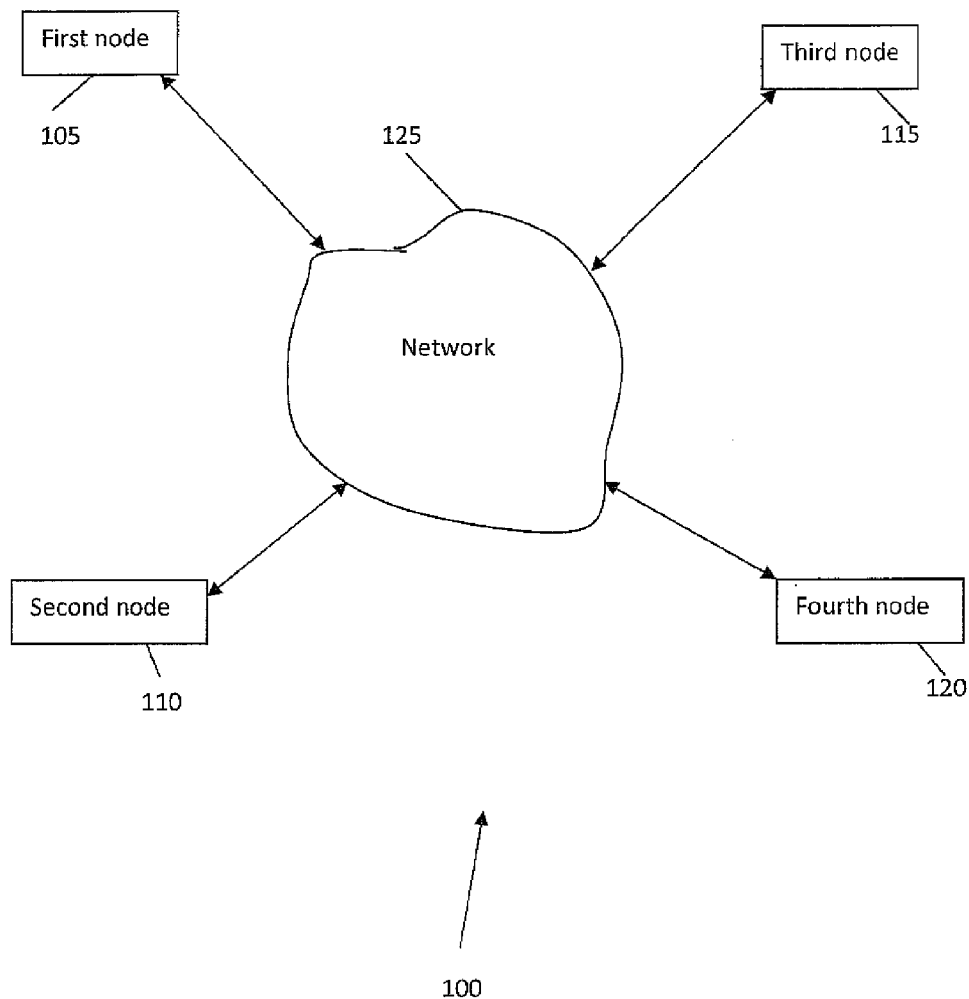
FIG. 1 is a schematic diagram of an embodiment of a network.

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

The Internet comprises a worldwide system of computing networks and comprises a public, self-sustaining facility that is accessible to tens of millions of people worldwide. Currently, the most widely used part of the Internet appears to be the World Wide Web, often abbreviated "WWW" or simply referred to as just "the web." The web may be considered an Internet service organizing stored content on various forms of storage devices. A storage device, such as volatile or non-volatile memory, may provide access to stored content through the use of hyperlinks, although claimed subject matter is not limited in scope in this respect. However, within a memory, for example, physical states of memory cells together comprise stored content. Any one of a host of types of hardware platforms is available to access such stored content. For example, HyperText Markup Language (HTML) may be used to create the content in the form of a web page, although, again, claimed subject matter is not limited in scope to this example. Likewise, the content may be stored on a server so that a web browser executing on a client device is able to communicate with the server via a network connection and access the stored content. A user may then be able to view the content on a display of the client device.

Unless specifically stated otherwise, a web page may refer to code for the particular web page, such as HTML, for example, or to displayable content of the particular web page if viewed using a web browser. Content, as used herein, may refer to information capable of being presented via a medium, such as a web site, for example. Content may comprise media, such as audio or video media, images, text, characters, or any other information capable of being presented to an individual, for example. A web page may, for example, include content or embedded references to content, such as images, audio, video, other web pages, or any other combination, just to name a few examples. One common type of reference used to identify or locate resources on the web comprises a Uniform Resource Locator (URL).

A query processing system may access records, such as, for example, associated with web pages, via a communications network, such as a local area network, wide area network, or the Internet, to name a few possible examples. A "query processing system," as used herein, therefore, may refer to a system for accessing stored content, such as may be stored on various nodes of a network. Accessible stored content may be utilized for query or searching purposes. For example, a query processing system may access web pages available via the Internet to determine a rank with respect to various search queries. Of course, a web page may include other types of electronic documents available via the web page.

For example, a query processing system may access records containing state information relating to a particular web page, such as font, language of text contained in the web page, number of characters in the web page, one or more subject matters of the web page, a number of images or other media embedded within the web page, a listing of incoming links to the web page, or a listing of outgoing links from the web page, to name just a few among different potential examples. Claimed subject matter is intended to include any type of stored content; however, content may be stored in a specific form so that it is retrievable, such as for storage in memory.

A query processing system may implement, execute, or perform a query process. A "query process," as used herein, may refer to a process relating to execution or performance of a query, for example. A query process may, for example, perform a search for specified content, such as, searching one or more web pages capable of being accessed via a network, such as the Internet.

A relational database may store state information to be accessed as or via a grouping of items or components, such as records, for example. In the context of a relational database, a record may also be referred to as a row or tuple, and may represent a single, implicitly structured stored item of information in the form of one or more states, for example. A database may be comprised of a number of records, rows, columns, or fields, such as in the form of a table, as one possible example. A record in a table may represent a set of related stored state information. Records in a database, such as a table, may have a similar structure, e.g., records in the table may contain similar fields. Of course, claimed subject matter is not limited to a table format, for example.

However, using a table as a non-limiting illustrative example, a record or row of a table may represent a web page that has been queried by query processing system. Columns may also represent items, such as language, font, language of text contained in the web page, number of characters in the web page, one or more subject matters of the web page, a number of images or other media embedded within the web page, a listing of incoming links to the web page, or a listing of outgoing links from the web page, to name just a few among many different potential examples. Likewise, subdivisions, such as of a row or column, may also comprise stored state information.

FIG. 1 is a schematic diagram of an embodiment of a network 100 that includes nodes, such as 105, 110, 115 and 120. These nodes may be in communication, such as via the network, including via the Internet 125, for example, as illustrated. A "node," as used herein, refers to any device or devices capable of communicating with other devices, such as via a network comprising other nodes. A node may, for example, comprise one or more processors, databases, servers, clients or combinations thereof, just to provide a few examples.

A node may include a query processing system that may process one or more queries by accessing stored content available via a network. A query processing system may therefore be capable of communicating via a network to access multiple nodes of stored content in order to process the content into records or the like, such as in connection with executing a query.

For example, a node may include a primary memory and a secondary memory. A primary memory may comprise a physical memory, such as a Random Access Memory ("RAM"), for example. A secondary memory may comprise a hard disk drive or some other storage device, for example. In one implementation, a secondary memory may be larger than a primary memory, but access to state information stored on the secondary memory may be slower than access to state information stored on a primary memory. Stored state information representing content processed by query processing system 100 may comprise web pages retrieved by a web crawler via the Internet, for example.

Query processing system 100 may comprise a shared-nothing query processing system, for example. A "shared-nothing" query processing system, as used herein, may refer to a query processing system comprising a particular node with local resources, such as storage or processing resources, which are separate and independent from local resources of other nodes. For example, a shared-nothing query processing system may include one or more servers. However, shared-nothing query processing systems may be connected via a network, such as the Internet, in a distributed setting.

Memory skew may present problems for shared-nothing query processing systems that perform map-reduce operations. Map-reduce operations are commonly utilized to perform bulk processing of records in a distributed computing system. For example, in a map operation, a master node may partition a computational problem up into smaller sub-problems, and distribute those to other nodes. These other nodes may do this again in turn. The nodes process the smaller problems, and pass the answers back. In a reduce operation, the master node takes the answers to the sub-problems and combines them to obtain the answer to the original computational problem.

In a worst case scenario, however, memory skew may result in disk spilling, which may slow query processing. Disk spilling, data spilling, or memory spilling may refer to writing stored state information to a secondary memory, such as a hard disk, before completing an operation using state information residing within a primary memory space. If, for example, a large number of records are being processed, an amount of space within a primary memory allotted for use while processing records may be utilized to capacity before processing is complete. If so, at least a portion of stored state information being processed may be spilled or written to a secondary memory, such as a hard disk, and subsequently read back into primary memory to complete processing. Disk spilling may therefore result in processing delays.

In one implementation, for example, a group or set of records to be processed may be loaded into an allotted set of memory locations within a primary memory. With sufficient memory capacity, a group or set may be fully processed within an allotted space within a primary memory. After completion of processing, results may be stored or otherwise written to a secondary memory. In a scenario in which disk spilling may occur, however, state information may be written to a secondary memory and retrieved for further processing several times, resulting in additional operations and typically delays.

Disk spilling may, for example, degrade performance due to mechanical components of disks. For example, disks may operate relatively slowly as compared to solid-state computer components. Relatively slow operation of disks may also result in contention slowdowns if concurrent processes, such as multiple task slots or task processes, attempt to access a disk simultaneously.

Skew reduction techniques may be utilized in some implementations. However, some techniques may not be satisfactory in certain instances, such as, for example, a query processing system performing user-defined operations. For example, user-defined functions may comprise customized operations that may not have been written in contemplation of possible memory skew issues. If so, an operation may utilize an allotted space in a primary memory in a relatively inefficient manner.

According to at least one implementation, however, state information spilling or overflow may be executed with better performance by spilling to a common portion of a node or to a primary memory of a peer node instead of to a secondary memory, such as a hard disk. Spilling to a primary memory located at a peer node, for example, may outperform spilling to secondary memory, such as a hard disk, even after accounting for increased risk of system failure to other nodes. Spilling to a primary memory located at a peer node may typically be faster since transmitting to a peer node may occur more quickly than writing to a hard disk or other secondary memory located at the particular node, for example.

Memory skew may be problematic for shared-nothing query processing systems, such as those performing map-reduce operations. For example, a dedicated map-reduce processing center, as an example, may apply a hardware configuration, such as a ratio of CPU cores to disk heads using a relatively uniform or predictable access pattern of map-reduce workloads. An occasional spill from a map or reduce process, however, for a specified hardware configuration may result in some or all jobs sharing a given node to becoming bottlenecked. As another example, if a query processing system is processing a set of incoming links to certain web pages, a handful of popular web pages may have millions of incoming links, which may result in memory skew by overwhelming primary memory for the particular node.

Despite the existence of skew reduction techniques, memory skew may be unavoidable in some situations. Also, programmers not comfortable or not familiar with complex query expressions may make use of customized user-defined functions which may be conducive to spilling. Some user-defined functions may create temporary formats or structures that are normally small but may become intractable for particular situations. A query may sometimes operate if an amount of state information to be processed is small, in which case spilling may not occur until, for example, an $N^{th}$ time a query is processed. However, a user-defined function may have passed from its original developer to other users or become embedded in a production work flow, making it risky to tamper with it at that point. Instead of attempting to exhaustively root out spilling, one approach may ensure that spilling does not result in a breakdown or significant degradation in query processing system performance.

Figure 2:
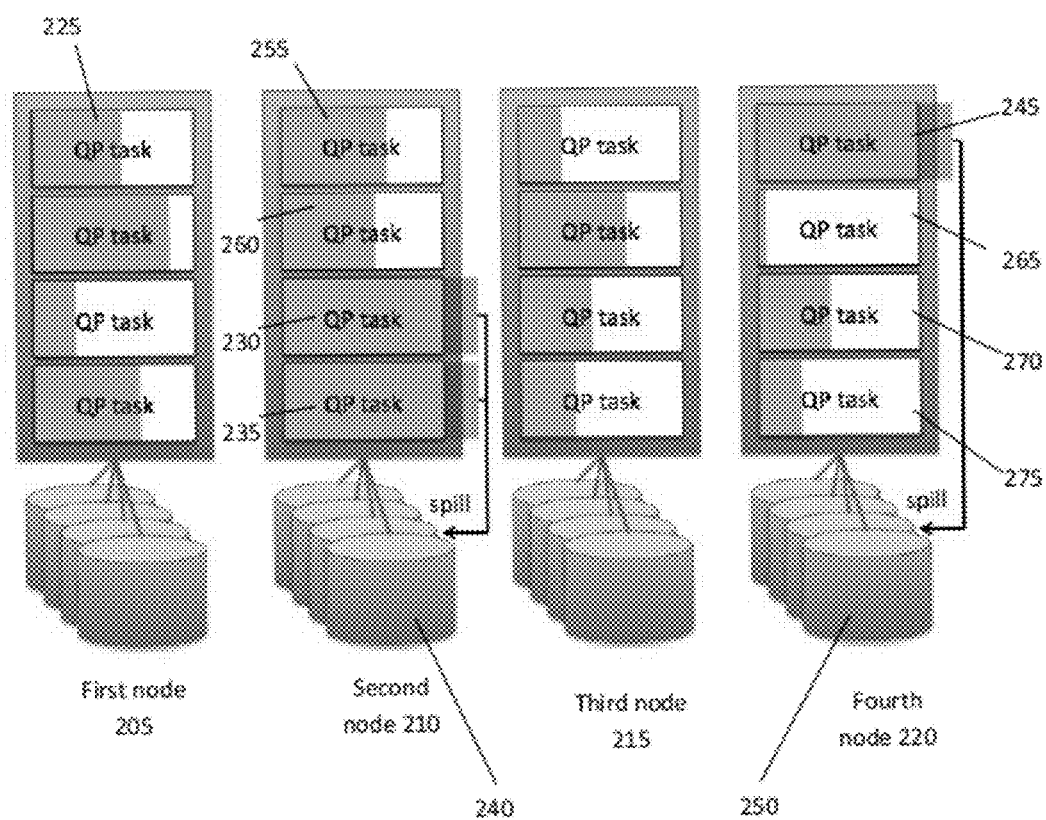
FIG. 2 is a schematic diagram of several query processing systems according to an implementation.

FIG. 2 is a schematic diagram of several query processing systems according to an implementation representing several nodes. For example, the query processing systems may implement open source Hadoop Map-Reduce operations, such as those shown in Hadoop MapReduce release 0.21.0, published Aug. 23, 2010 available at http://hadoop.apache.org. As shown, first node 205, a second node 210, a third node 215, and a fourth node 220 may represent peer nodes with query processing systems.

A node comprising a query processing system may execute one or more virtual machine (VM) with a map or reduce task (a map-reduce job may be comprised of one or more map tasks and one or more reduce tasks). As shown, first node 205, second node 210, third node 215, and fourth node 220 include four task slots. Although four task slots are shown in FIG. 2, it should be appreciated that more or fewer than four task slots may be utilized in an implementation.

A query, such as a Pig Latin Query in a parallel processing architecture, may be compiled into one or more map-reduce jobs. A VM comprising a task slot may have a fixed physical memory capacity. For example, a task slot may be designated or otherwise have access to a fixed amount of physical memory, such as for random access to virtual memory, for example.

As shown in FIG. 2, one or more task slots may include a shaded area to represent or indicate a fraction of a task slot's VM memory that is utilized. As shown, approximately 50% of task slot 225 is shaded to indicate that approximately 50% of a VM memory for task slot 225 is utilized. If a task slot runs out of VM memory, a memory manager at a node may spill to a local hard disk or other local secondary memory. For example, in this simplified, illustrative example, second node 210 may incur a spill from task slots 230 and 235. As shown, a shaded area of task slot 230 is greater than dimensions of task slot 230 to indicate that task slot 230 would be over capacity to complete a particular operation or computation. As a result, task slot 230 may spill to one or more local hard disks 240 or other secondary memories. Task slot 235 may also be over capacity, resulting in a spill to local hard disks 240, for example. Fourth node 220 may also incur a spill. As shown, task slot 245 may be insufficient large to complete a task, resulting in a spill to one or more local hard disks 250 or other secondary memories.

However, as shown in FIG. 2, other task slots, such as, for example, at second node 210 and fourth node 220, may be below capacity. For example, at second node 210, allocated memory for task slots 255 and 260 appear to be not fully utilized. Similarly, task slots 265, 270, and 275 at fourth node 220 appear to contain underutilized task slot memory. Accordingly, spilling to a hard disk at second and fourth nodes 210, 220 may be wasteful, since other task slots at the second and fourth nodes 210, 220 appear to be below capacity.

Figure 3:
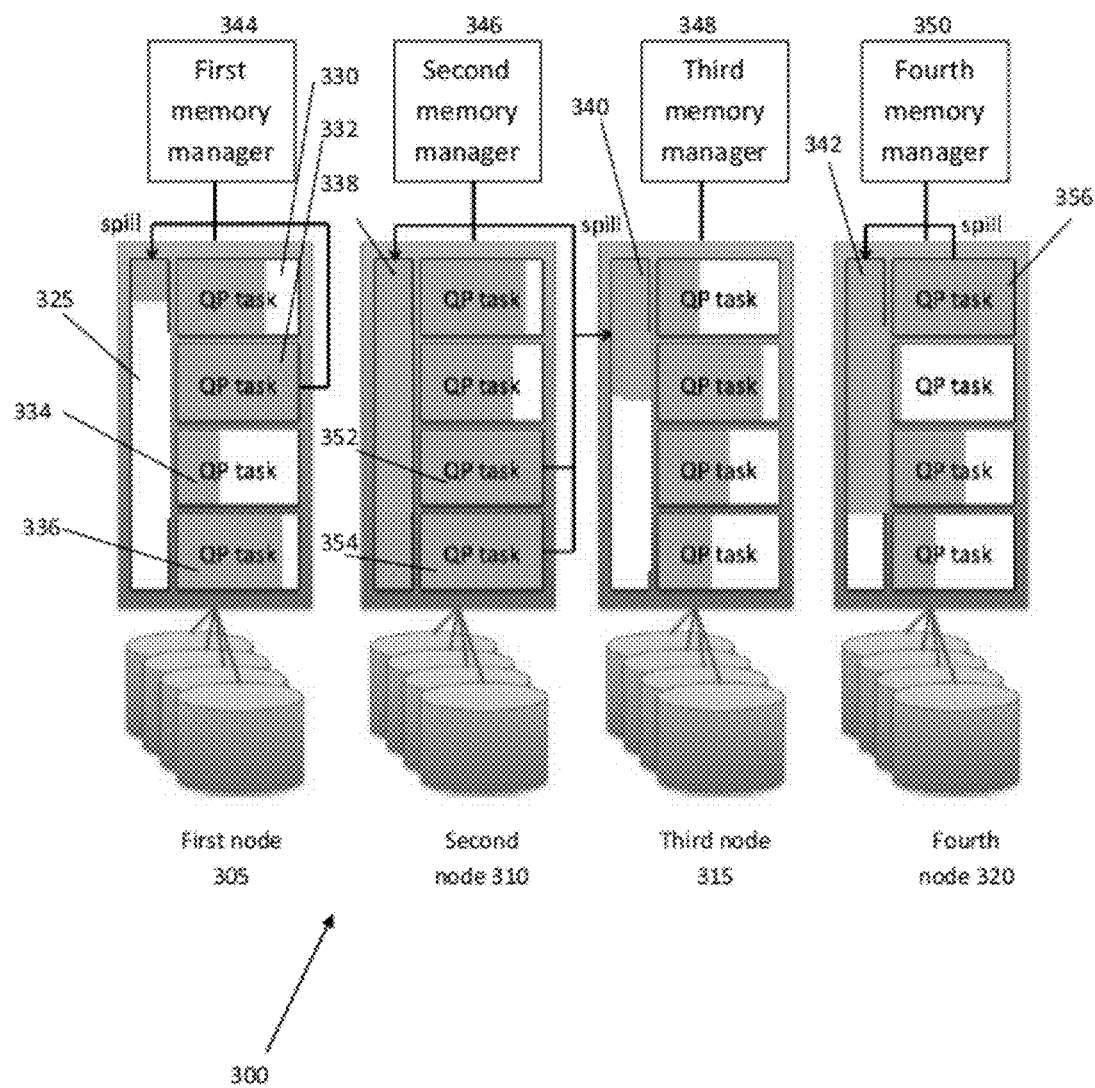
FIG. 3 is a schematic diagram of four nodes according to an implementation.

FIG. 3 is a schematic diagram of four nodes according to an implementation. Query processing systems in FIG. 3 which may take advantage of memory for under-utilized task slots, unlike query processing systems shown in FIG. 2. As shown, first node 305, a second node 310, a third node 315, and a fourth node 320 may be divided into several task slots. A node may execute a virtual machine (VM) with a map or reduce task. For example, in an implementation, a node such as first node 305, second node 310, third node 315, or fourth node 320 may include four task slots and a memory sponge. Although four task slots are shown in FIG. 3, it should be appreciated that more or fewer than four task slots may be utilized at a data center node in an implementation. A "memory sponge," as used herein, may refer to a shared memory. For example, a memory sponge may be accessible to one or more task slots at a node. In an implementation, a memory sponge may not be allocated to any particular task slot. If a particular task slot experiences memory overflow, for example, spilling may be to a local memory sponge located at the same node as the particular task slot (if available). Likewise, spilling may also be to memory sponges of peer nodes. A hard disk or other secondary memory may be utilized in this scenario after exceeding capacity for these recourses, for example. A memory sponge may handle relative large and sequential blocks of memory such as, e.g., 10 Megabyte blocks. In one particular implementation, each block of memory may only have a single process and writes to or reads from the block, so that there are no concurrency issues that some shared-memory systems deal with. A rationale for use of a memory sponge instead of spilling to a local disk is to avoid the slowness/delays associated with spilling to disk.

In FIG. 3, first node 305 may include a first memory sponge 325. First node may also include one or more task slots or task processes, such as a first task slot 330, a second task slot 332, a third task slot 334, and a fourth task slot 336. One difference between a query processing system shown in FIG. 3 and a query processing system shown in FIG. 2 may include task slot size. For example, assume a total amount of memory available at a node may be substantially the same in both query processing systems. In query processing system shown in FIG. 3, one or more task slots may be reduced in size and the amount by which a task slot is reduced may be allocated to a local memory sponge. As shown in FIG. 3, for example, memory for memory sponge 325 may acquired by reducing sizes of task slots 330, 332, 334, and 336 relative to the sizes of task slots shown in FIG. 2. Of course, this is merely a simplified illustrative example and claimed subject matter is not so limited.

Thus, second node 310 may include a second memory sponge 338. Third node 315 may include a third memory sponge 340. Fourth node 320 may include a fourth memory sponge 342. If, for example, a task being executed via second task slot 332 of first node 305 achieves VM memory capacity, available VM memory in first memory sponge 325 may be utilized, as shown in FIG. 3. For example, a first memory manager 344 may direct or otherwise affect a task being executed so that available VM memory in first memory sponge 325 may be utilized. On the other hand, if additional or sufficient VM memory is not available in memory sponge 325, a memory sponge at a peer node may be considered or evaluated. In a network, for example, it may be more efficient to employ a memory sponge of a peer node than it would be to employ a secondary memory, such as a hard disk, of the node having insufficient space in a local memory sponge.

Peer nodes in one implementation may be associated with one or more memory managers. In an example, shown in FIG. 3, a node may include a memory manager. As shown, second node 310 may include second memory manager 346, third node 315 may include third memory manager 348, and fourth node 320 may include fourth memory manager 350, for example. A memory manager may, for example, direct or at least affect a flow of state information to a local memory sponge or to a memory sponge located at a peer node. If a local memory sponge at a node does not have sufficient VM memory for a particular task, for example, a memory manager for that node may communicate with one or more memory managers at peer nodes, for example, to determine whether available VM memory may be utilized. In one implementation, for example, a memory manager may transmit a message to one or more peer nodes. For example, a memory manager may have knowledge of network addresses for other nodes in a network and may transmit messages to those network addresses. If VM memory in a memory sponge is available at a peer node, for example, a memory manager may transmit or initiate transmission of state information to a peer memory sponge. However, alternatively, in one or more implementations, a single memory manager may affect a flow between nodes or between one or more memory sponges, for example.

Referring back to FIG. 3, second node 310 may include task slot 346 and task slot 348, tasks for both of which may exceed allocated capacity. Accordingly, second memory manager 346 may utilize second memory sponge 338 to store state information associated with tasks for task slots 346 and 348. As shown, however, second memory sponge 338 does not appear to contain sufficient VM memory for both tasks associated with task slots 346 and 348. Accordingly, third memory sponge 340 located at third node 315 may be utilized. If third memory sponge 340 does not contain sufficient VM memory, for example, fourth memory sponge 342 or additional memory sponges (not shown) may also be utilized. Fourth node 320 may include a task slot 356 containing insufficient VM memory to complete processing of a task, as illustrated. Accordingly, state information associated with a task for task slot 356 may be stored in fourth memory sponge 342, for example. One possible drawback of an approach as illustrated by FIG. 3 is that task slots may have less primary memory capacity and a lower threshold for spilling. However, in at least some implementations disadvantages of reduced sizes of task slots may be offset by advantages of spilling to a memory sponge instead of spilling to secondary memory.

Figure 4:
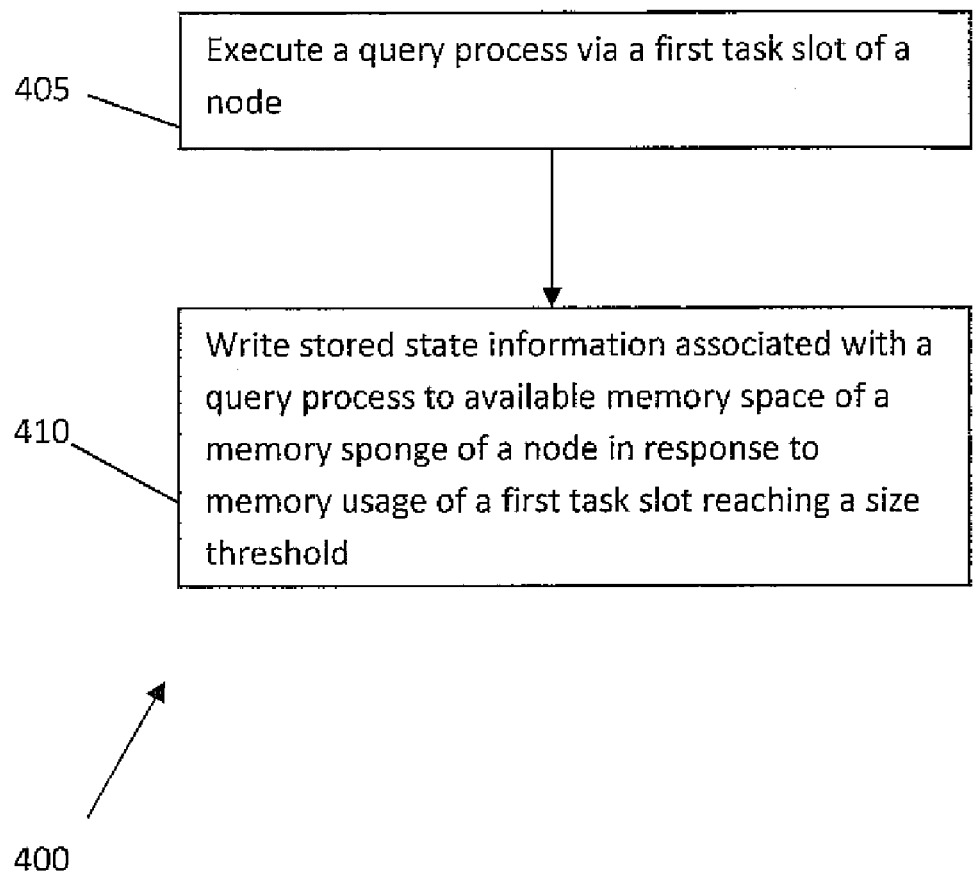
FIG. 4 is a flow diagram of a process for spilling according to an implementation.

FIG. 4 is a flow diagram 400 of a process for spilling according to an implementation. Embodiments in accordance with claimed subject matter may include all of, less than, or more than blocks 405 and 410. Also, the order of blocks 405 and 410 is merely an example order. At operation 405, a query process may be executed via a first task slot of a node. At operation 410, stored state information associated with a query process may be written to available memory space of a memory sponge of a node in response to memory usage of a first task slot reaching a size threshold. A memory sponge may be accessible to a first task slot and at least a second task slot of a node, in an example implementation.

An example implementation of processing content in which spilling to a memory sponge may be employed is illustrated by FIG. 4. As a real-world example of employing an embodiment, a Pig computing platform, for example, may take high-level structured scripts or queries written in Pig Latin and may translate such scripts or queries into map-reduce execution instructions or operations, which may be executed in Hadoop. For example, a system such as "Pig" may be utilized to process high-level structured or queries. "Pig," as used herein, may refer to a platform such as that shown in Pig Latin Reference Manual 1, release 0.8.0, published Mar. 29, 2011 and available at http://pig.apache.org/.

Pig and Hadoop may be executed over tens of thousands of computing platforms, for example. A salient property may include a capability for parallelization of computations, which in turn may enable Pig programs to handle relatively large computational tasks. Scripts or queries may be written in Pig Latin, a processing language for a Pig computing platform. Map-reduce execution instructions may be executed using Hadoop, a software framework that supports computationally intensive distributed applications. Hadoop may enable applications to work with thousands of nodes and petabytes of state or signal information, for example.

In one implementation, a map-reduce environment, such as a Hadoop map-reduce environment, may be executed or run on an n+1 node cluster. A "cluster," as used herein may refer to a grouping of nodes for processing a particular task or performing a particular operation, for example. An n+1 node cluster may comprise a master node (referred to as a "Job-Tracker"), and n worker nodes (referred to as "Task-Trackers"). A TaskTracker may communicate with a Job-Tracker to obtain tasks to be executed. A task, for example, may comprise a parallel slice of a map or reduce phase of a map-reduce job. With respect to Pig, for example, a Hadoop task may correspond to one parallel partition of a query processing pipeline.

A "group-by process," as used herein, may refer to a process for grouping or moving stored state information. A group-by process may comprise a semantic operation of bringing together records sharing a common key. A group-by process may be implemented in multiple ways, including sorting or hashing. For example, data may be organized or moved so that records with a common key are available to be processed together at a processing node. A key may comprise a field in a record or a new field derived from existing fields in the record in one particular implementation. For example, grouped rows of stored state information of a hash table may be updated as new rows or stored state information are received. If a hash table does not fit into a memory location, the table may be partitioned into smaller work tables which may be recursively partitioned until they fit into the memory location.

If a TaskTracker executes a map or reduce task, the TaskTracker may do so via a Java™ virtual machine ("JVM"), for example. However, tasks may use a dedicated memory pool "leftover" memory if tasks underutilize the memory pool may therefore be wasted. It may be possible to tailor memory allocation on a per-job basis, but unfortunately it may be difficult to predict job memory utilization a-priori, and skew may result in non-uniform memory utilization across tasks of a given job's map or reduce phase.

However, in an implementation, a TaskTracker may execute T concurrent tasks, for example, where T comprises a system-wide parameter. A TaskTracker node may be treated at least approximately as having T task "slots," as depicted in FIGS. 2 and 3, for example. If occupied, a task slot may contain an executing JVM that may consume certain disk, CPU and memory resources, for example. A data center may typically have a configuration such that a number of CPU cores, disk heads and slots are able to achieve a desired throughput under an anticipated or expected workload. It may be desirable for Pig jobs to have a JVM memory size so that M=T, for example, where M denotes a total physical memory available for tasks on a node. In other words, Pig may operate in a manner so that its tasks do not swap virtual memory. For example, this may occur because swapping to virtual memory may result in poor random I/O access patterns or overall subpar performance.

If a Pig task surpasses JVM memory capacity, Pig's memory manager may spill in an embodiment. Pig's structure for intermediate data sets may be referred to as a "data set bag." A data set bag may comprise a collection of tuples of state information that may permit insertion and iteration, for example.

Data set bags may be registered with a Pig state information manager. A Pig state information manager may, for example, track some or all data set bags in a query processing system, estimate sizes, and may track memory utilization relative to a JVM memory size. If available memory becomes low, for example, a memory manager may spill at least some state information to a memory sponge as shown in FIG. 3.

In an embodiment, there may be at least three varieties of data set bags—regular bags, ordered bags (e.g., an iteration may produce tuples in sorted order according to one or more comparison functions), or distinct bags (e.g., an iteration may prevent duplicates such as tuples). If spilling occurs, a data set bag may be divided into chunks of a particular size C (e.g., C may be 10 MB). Likewise, chunks may be spilled independently. With ordered or distinct bags, a chunk may be sorted (and duplicate-prevented, in a case of distinct bags) prior to being spilled. Iterating over an ordered or distinct bag of size S may entail performing an N-way merge of N=[S/C] ordered chunks.

Skew/spilling may occur in a shared-nothing query environment. Spilling to disk may cause performance degradation. Table 1 shown below lists possible scenarios that may lead to spilling in Pig and may not be easily addressed by known skew reduction techniques. In these scenarios, for example, one or a handful of keys may have a set of values that do not fit in memory for one task slot. For example, a key relating to records for people living in a relatively large city, such as New York City, may potentially be associated with millions of records. Offending keys in some instances may correspond to unexpected anomalies.

TABLE 1

Examples of possible spill scenarios in Pig

| Scenario | Example | Possible reason for spill |
| --- | --- | --- |
| Built-in holistic aggregation functions | Find a number of distinct inlinks to a web page by grouping URL-level signal or state information by site and aggregating | Some web pages have millions of distinct inlinks and a determination of a distinct count may involve materializing them in a single location |
| User-defined holistic functions | Group a web crawl data set by language and apply a user-defined function that may find anchor text keywords for a given language | A language classifier may mark a substantial fraction of pages (e.g., ones with little or cryptic text) as "language unknown," and a corresponding data set bag may be provided to a user-defined function that may overflow memory |
| User-defined function that | Compare user web click logs across two | "Bots" may have generated millions of |
| create temporary data set bags | time periods (e.g., last week and this week): cogroup by user and apply a user-defined function to identify web sites that a user visited this week more often than last week | simulated user clicks, which may lead to huge data set bags in a user-defined function that may overflow memory |
| Stored data set with data set bags embedded in tuples | A web crawl data set, with one tuple per web page, and set-valued fields for inlinks and anchor text. | Some sites may have millions of inlinks and anchor text snippets, which may overflow memory if loaded into data set bags |

A shown above in Table 1, one scenario in which spilling may occur relates to built-in holistic aggregation functions. For example, a number of distinct inlinks to a web page may be discovered by grouping URL-level signal or state information by site and aggregating. A spill may result because some web pages may have millions of distinct inlinks and a determination of a distinct count may involve materializing them in a single location in some cases.

Another scenario in which spilling may occur relates to use of user-defined holistic functions. For example, web crawl information may comprise groups according to a language used in crawled web pages and a user-defined function may be utilized to determine anchor text keywords for a given language. Spilling may occur in a scenario, as one example, because a language classifier may mark a substantial fraction of web pages (e.g., ones with little or cryptic text) as "language unknown," and a corresponding data set bag may be provided to a user-defined function that may overflow memory.

Another scenario in which spilling may occur relates to a user-defined function that may create temporary data set bags. For example, user web selection or click logs may be applied across two time periods (e.g., last week and a current week). Click logs may be co-grouped by user and a user-defined function may be applied to identify web pages that a particular user has visited during a current week more often than were visited during a previous week. A spill may occur as a result of programs or "bots" that may have generated millions of simulated user clicks, which may lead to data set bags in a user-defined function input that may overflow memory.

An additional scenario in which spilling may occur relates to stored data sets with data set bags embedded in tuples. For example, a web crawl data set may include one tuple per web page and may include set-valued fields for inlinks and anchor text. Spilling may occur because, for example, some sites may have millions of inlinks and anchor text snippets, which may overflow memory if loaded into data set bags.

Cross-memory spilling mechanisms may be implemented to spill information to a memory sponge at a node or to a memory sponge at a different node. In one implementation, for example, a memory manager, such as that shown in FIG. 3, for example, may oversee memory management for one or more nodes. In one example implementation, a node may include a memory manager to direct or otherwise arrange for a task slot to write to a local memory sponge at a node if a task slot reaches or approaches capacity.

Cross-spilling mechanisms or methods may be tailored with different operations, for example. In one implementation, if a task slot at a node reaches capacity, state or signal information may first be written to a local memory sponge at a node. However, if a local memory sponge reaches capacity and additional information for a particular task is still remaining, the additional information may be written to a memory sponge at one or more peer nodes.

Some mechanisms may handle spilling and retrieval of large, fixed-size blocks of serialized state information (in one example implementation, 10 MB blocks may be utilized), although claimed subject matter is not so limited. With a shared memory spill mechanism, tasks running on a given node may have access to a memory sponge. To achieve shared access, for example, a particular file F may be memory-mapped into an address space of one or more task slots. File F may reside in a memory-backed file system such as, for example, a temporary file storage facility ("tmpfs") or ram-disk, so as to reduce occurrence or use of hard disk I/O, for example.

A memory sponge may contain a header followed by an array of block frames. A header may be used to synchronize access to block frames. A first field in a header may contain a spin lock to control access to a remainder of the header. Tasks may use interlocking instructions, such as test-and-set, to atomically read, modify, and write a lock field. A header may also contain a count of a number of block frames and a marker for one or more frames to indicate whether a particular frame is occupied and, if so, by which task (tasks may have unique identifiers).

To reserve a frame, for example, a task may lock a header and scan the header until a free frame is found, at which point the task may insert its task identifier (id). Tasks may be responsible for freeing frames if the frames are no longer needed. To reduce "leaks" due, for example, to irresponsible tasks or sudden task failures, a special daemon may scan a header and free any frames whose task id corresponds to a task that is no longer running, such as periodically. Of course, claimed subject matter is not limited in scope in this respect.

As discussed above, Pig's spillable structure may comprise a data set bag. There may be three types of data set bags (e.g., regular, sorted or distinct), and, for example, a data set bag may implement a spill( ) method inherited from an abstract data set bag class. An abstract data set bag class may be determined via an abstraction process, for example. "Abstraction," as used herein, may refer to a process by which information or programs are defined with a representation similar to its meaning (semantics), while hiding implementation details. Abstraction may, for example, reduce and factor out details to allow a programmer to focus on a few concepts at a time. A system may have several abstraction layers whereby different meanings and amounts of detail are exposed to a programmer. An abstract data set bag may comprise an abstract parent implementation of a data set bag, for example. In one particular implementation, an abstract data set bag may be considered abstract in the sense that it cannot be instantiated except by instantiating a child that inherits from it.

A spill( ) method implementation may create and track temporary files that contain spilled state information. These three spill( ) methods may be modified to handle abstract I/O streams instead of file I/O streams, and may implement an abstract spill location class with three concrete implementations: one for disk(s) as a spill location, one for shared memory(s) as a spill location, and one for peer memory sponge(s) as a spill location. A particular spill location implementation may support writing and reading of fixed-size blocks via a simple OpenOutputStream( )/OpenInputStream( ) interface, for example.

Various spill location classes may be implemented to spill to a list of locations in a preference order, such as, for example: (a) spill to shared memory if possible; (b) if shared memory is out of space spill to peer sponges; or (c) if peer sponges are collectively out of space, spill to disk.

An approach as shown in FIGS. 3 and 4 may be complementary to skew reduction or operator migration techniques. Whereas these seek to reduce spilling, an approach in accordance with FIGS. 3 and 4 may make spilling more efficient in cases where spilling cannot be avoided easily, such as, for example, in cases dealing with user-defined processing elements or nested data sets, as examples Distributed Shared Memory (DSM) systems may allow a node of a cluster to have access to memory of other nodes in a cluster, creating an illusion of a global address space. In DSM systems, one or more memory location(s) may have multiple concurrent readers or writers. To improve performance, DSM systems may rely on local caching. Consequently, a coherence protocol, chosen in accordance with a consistency approach, may be used to maintain memory coherence. Protocols may not scale to clusters with thousands of nodes. In contrast, an approach in accordance with FIGS. 3 and 4 may be tailored to shared-nothing, or data-parallel scenarios in which a node's intermediate query processing state is private, so synchronization may not be required, as examples. An approach in accordance with FIGS. 3 and 4 may also cater to sequential access patterns that may read or write large swaths at a time.

An approach as discussed above may be complementary to skew reduction and an approach may be applied so that spilling may be relatively fast in cases where skew cannot (easily) be avoided. A spilling technique may place spilled information in a memory sponge or pool of memory that may be shared among nodes in a cluster, thereby exploiting non-uniform memory utilization or potentially avoiding or reducing use of disk I/O.

Figure 5:
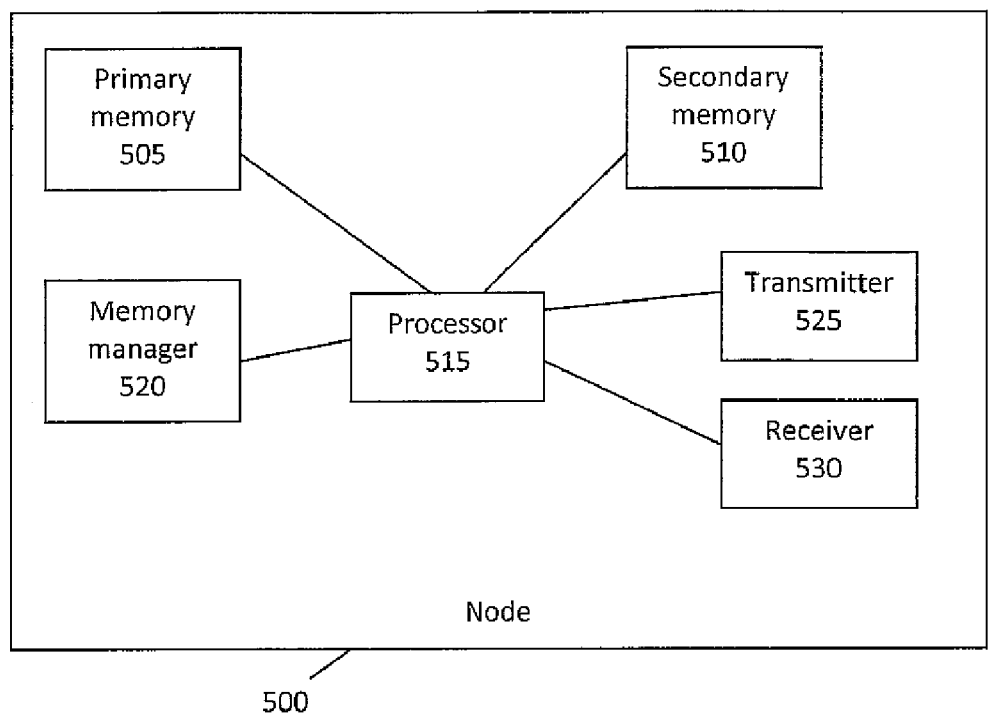
FIG. 5 is a schematic diagram of a node according to an implementation.

FIG. 5 is a schematic diagram of a node 500 according to an implementation. As shown, node 500 may include a primary memory 505, secondary memory 510, processor 515, memory manager 520, transmitter 525, and a receiver 530, for example. Primary memory 505 may comprise memory in which task slots are implemented and secondary memory may comprise a hard disk, as discussed above with respect to FIG. 3, for example. Memory manager 520 may direct or otherwise control use of a local memory sponge or may contact one or more peer nodes and may store state information for a task in a memory sponge of a peer node, for example. Transmitter 525 may transmit one or more messages to one or more peer nodes and receiver 530 may receive one or more messages from one or more peer nodes, for example.

Some portions of the previous detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain example techniques have been described or shown herein using various methods and systems, it should be understood by those skilled in the art that various other modifications may be made, or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all implementations falling within the scope of any appended claims, or equivalents thereof.

What is claimed is:

1. A system, comprising:
    a first node including a primary memory and a secondary memory, said primary memory comprising a first memory sponge and one or more task processes having a memory capacity;
    a second node comprising a second memory sponge;
    a processor to execute a query process, wherein in response to memory usage of any of said one or more task processes reaching said memory capacity, said processor is capable of utilizing available memory space in said memory sponge to execute said query process, and said processor is capable of utilizing said second memory sponge of said second node in response to said available memory space of said first memory sponge being insufficient to complete execution of said query process; and
    a memory manager to manage utilization of said available memory space of said nodes.

2. The system of claim 1, wherein said one or more task processes comprises a virtual machine with a map or reduce task.

3. The system of claim 1, wherein said processor comprises a shared-nothing processor.

4. The system of claim 3, wherein in response to said available memory space of said first memory sponge being insufficient to complete execution of said query process, said processor is capable of initiating a memory spilling process to said second node.

5. The system of claim 1, wherein said secondary memory comprises one or more hard disk drives.

6. The system of claim 1, wherein said query process comprises indexing of one or more web sites.

7. The system of claim 1, wherein said stored information is nested inside of a web site record.

8. A method, comprising:
    executing a first query process via a first task process of a primary memory of a first node and a second query process via a second task process of said primary memory of said first node;
    spilling state information associated with said first query process to a first memory sponge of said primary memory at least in part in response to said first task process reaching a first memory capacity;
    spilling said state information to a second memory sponge of a second node in response to said available memory space of said first memory sponge being insufficient to complete execution of said first task process; and
    managing utilization of available memory space of said nodes via a memory manager.

9. The method of claim 8, further comprising spilling state information associated with said second query process to said first memory sponge of said primary memory at least in part in response to said second task process reaching a second memory capacity.

10. The method of claim 8, further comprising executing a virtual machine with a map or reduce task via use of said first task process or said second task process.

11. The method of claim 8, further comprising writing said state information to one or more hard disks of said node in response to completing said query process.

12. An article, comprising:
    a storage medium comprising machine-readable instructions executable by a special purpose machine to:
    execute a first query process via a first portion of memory at a first data center node;
    writing state information associated with said first query process to available memory space of a first memory sponge of said first data center node in response to memory usage of said first portion of memory reaching a size threshold, said first memory sponge being accessible to said first query process or to a second query process of said first data center node;
    writing said state information to a second memory sponge of a second data center node in response to said available memory space of said first memory sponge being insufficient to complete execution of said first or second query processes; and
    managing utilization of available memory space of said first and second data center nodes.

13. The article of claim 12, wherein said machine-readable instructions are further executable to perform a map or reduce task via use of said first memory portion or a second memory portion of said first data center node.

14. The article of claim 12, wherein said machine-readable instructions are further executable to index one or more web sites as part of a query process.

15. The article of claim 12, wherein said machine-readable instructions are further executable to write said state information to one or more hard disks of said first data center node in response to completing said first query process.

* * * * *